United States Patent
Villeval et al.

(10) Patent No.: US 10,379,201 B2
(45) Date of Patent: Aug. 13, 2019

(54) RADAR INTERFERENCE MITIGATION AND COLLABORATIVE OPERATION

(71) Applicant: GM Global Technology Operations LLC, Detroit, MI (US)

(72) Inventors: Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 336 days.

(21) Appl. No.: 15/334,866

(22) Filed: Oct. 26, 2016

(65) Prior Publication Data
US 2018/0113191 A1   Apr. 26, 2018

(51) Int. Cl.
*G01S 7/02*   (2006.01)
*G01S 13/34*  (2006.01)
*G01S 13/93*  (2006.01)

(52) U.S. Cl.
CPC .......... *G01S 7/023* (2013.01); *G01S 13/343* (2013.01); *G01S 13/931* (2013.01); *G01S 2013/9375* (2013.01)

(58) Field of Classification Search
CPC ...... G01S 7/023; G01S 7/2813; G01S 13/343; G01S 13/345; G01S 13/931
See application file for complete search history.

(56) References Cited

U.S. PATENT DOCUMENTS

| | | | | |
|---|---|---|---|---|
| 4,901,082 A * | 2/1990 | Schreiber | ............... | G01S 7/28 342/162 |
| 5,280,288 A * | 1/1994 | Sherry | ............... | G01S 7/023 342/159 |
| 5,317,320 A * | 5/1994 | Grover | ............... | G01S 7/003 342/103 |
| 5,345,470 A * | 9/1994 | Alexander | ........... | G01S 7/023 375/144 |
| 6,697,013 B2 * | 2/2004 | McFarland | ........... | G01S 7/021 342/159 |
| 7,155,230 B2 * | 12/2006 | Tsien | ............... | G01S 7/021 455/450 |
| 8,130,680 B1 * | 3/2012 | McIntire | ............... | G01S 7/023 348/59 |
| 2002/0130810 A1 * | 9/2002 | Gottwald | ........... | G01S 13/222 342/159 |
| 2003/0030583 A1 * | 2/2003 | Finn | ............... | B60R 21/013 342/70 |
| 2004/0130482 A1 * | 7/2004 | Lin | ............... | G01S 7/023 342/82 |
| 2006/0244653 A1 * | 11/2006 | Szajnowski | ........... | G01S 7/282 342/70 |
| 2010/0245154 A1 * | 9/2010 | Szajnowski | ........... | G01S 7/023 342/90 |

(Continued)

*Primary Examiner* — Peter M Bythrow
(74) *Attorney, Agent, or Firm* — Cantor Colburn LLP

(57) ABSTRACT

A radar system mounted on a platform includes a transmitter turned off during a silent interval, and a receiver to receive one or more signals resulting from transmission by one or more other radars that transmit linear frequency modulated signals during the silent interval. A processor estimates parameters of the one or more other radars. The parameters include bandwidth and slope of the respective linear frequency modulated signal and the parameters are used to modify a transmitted signal or the processing by the radar system.

10 Claims, 4 Drawing Sheets

(56) References Cited

U.S. PATENT DOCUMENTS

| | | | |
|---|---|---|---|
| 2011/0122014 A1* | 5/2011 | Szajnowski | G01S 7/023 342/109 |
| 2011/0291875 A1* | 12/2011 | Szajnowski | G01S 7/023 342/70 |
| 2016/0124075 A1* | 5/2016 | Vogt | G01S 7/023 342/13 |
| 2017/0208474 A1* | 7/2017 | Mody | H04W 16/14 |
| 2018/0081030 A1* | 3/2018 | McMahon | A61B 5/0507 |

* cited by examiner

RADAR INTERFERENCE MITIGATION AND COLLABORATIVE OPERATION

INTRODUCTION

The subject invention relates to radar interference mitigation and collaborative operation.

Radar systems are used in a wide range of applications for target detection and tracking. One exemplary application involves automotive radar systems that detect obstacles and aid in collision avoidance and automated driving. Typically, constant wavelength linear frequency modulation (CW-LFM) is used to estimate range, velocity, and angle. As more and more automobiles are equipped with such radar systems, the likelihood of similarly equipped automobiles operating proximate to each other increases, especially in an urban environment. Accordingly, it is desirable to achieve radar interference mitigation and collaborative operation by identifying proximate radar systems and estimating their parameters.

SUMMARY

In one exemplary embodiment of the invention, a radar system mounted on a platform includes a transmitter to be turned off during a silent interval, a receiver to receive one or more signals resulting from transmission by one or more other radars that transmit linear frequency modulated signals during the silent interval, and a processor to estimate parameters of the one or more other radars. The parameters include bandwidth and slope of the respective linear frequency modulated signal and the parameters are used to modify a transmitted signal or the processing by the radar system.

In another exemplary embodiment of the invention, a method of operating a radar system mounted on a platform includes turning off a transmit portion of the radar system during a silent interval, receiving one or more signals resulting from transmission by one or more other radars that transmit linear frequency modulated signals during the silent interval, and estimating parameters of the one or more other radars. The parameters include bandwidth and slope of the respective linear frequency modulated signal; and modifying a transmitted signal or the processing by the radar system based on the parameters.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
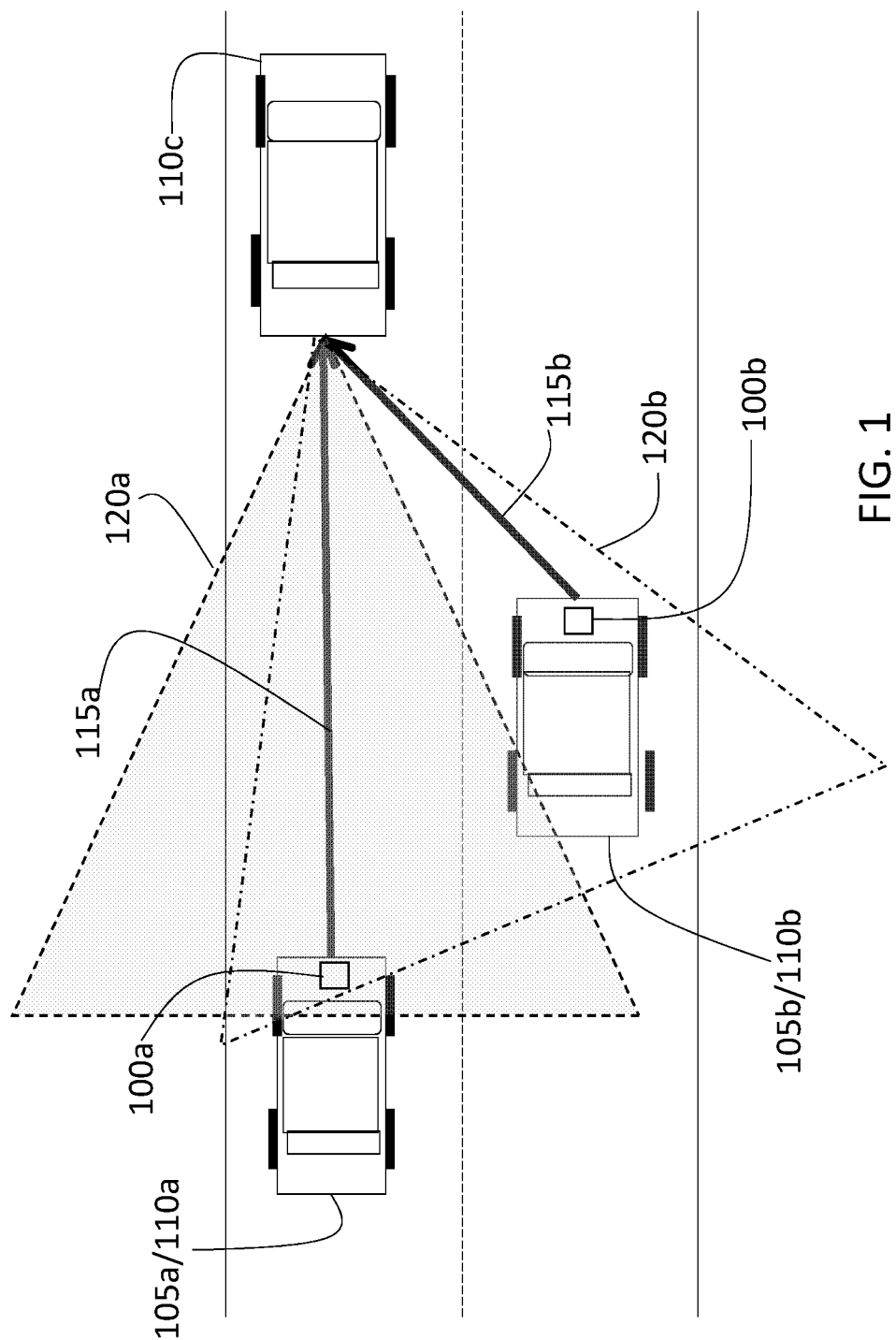
FIG. 1 shows an exemplary scenario involving two radar systems, according to one or more embodiments, in proximity to each other.

The following description is merely exemplary in nature and is not intended to limit the present disclosure, its application or uses. It should be understood that throughout the drawings, corresponding reference numerals indicate like or corresponding parts and features.

As previously noted, vehicles can be equipped with CW-LFM radar systems to perform target detection and tracking. Other platforms (e.g., equipment in automated factories, different types of vehicles such as construction and farm equipment) can also be equipped with radar systems. When these platforms are proximate to each other, their radar systems can interfere with each other. On the other hand, the different radar systems can enhance each other's performance through resource sharing. Both mitigation of interference from other radar systems and cooperative operation require a given radar system to know relevant parameters of the other radar systems. In a CW-LFM radar system, the transmitted signal (i.e., chirp) is defined by the slope of the modulation (i.e., chirp slope), the period of each chirp (Tc), and total bandwidth (BW) used. Each of these parameters can be modified according to one or more embodiments detailed herein to achieve interference mitigation or collaborative operation.

In accordance with an exemplary embodiment of the invention, FIG. 1 shows an exemplary scenario involving two radar systems 100a, 100b in proximity to each other. Three automobiles 110a, 110b, 110c (generally referred to as 110) are shown in FIG. 1. Two of the automobiles 110a, 110b are platforms 105a, 105b (generally 105) for radar systems 100a, 100b (generally 100). The transmission 115a from automobile 110a and the transmission 115b from automobile 110b are shown. The transmissions 115a, 115b result, respectively, in reflections in areas 120a and 120b. As FIG. 1 indicates, the reflections resulting from transmission 115b by automobile 110b reach the radar system 100a of the automobile 110a, as well. The radar system 100a also receives reflections resulting from its own transmission 115a. If the two radar systems 100a, 100b are operated with the same parameters, the reflections resulting from transmission 115b by radar system 100b will interfere with the reflections resulting from transmission 115a. According to one or more embodiments detailed herein, the parameters of at least one of the radar systems 100 are adjusted to mitigate interference. In addition, knowledge of the parameters of the other radar systems 100 is used to enhance detection and tracking by a given radar system 100. That is, in addition to reflections resulting from transmission by a given radar system 100, reflections resulting from transmission by another radar system 100 can also be processed based on knowing the parameters.

Figure 2:
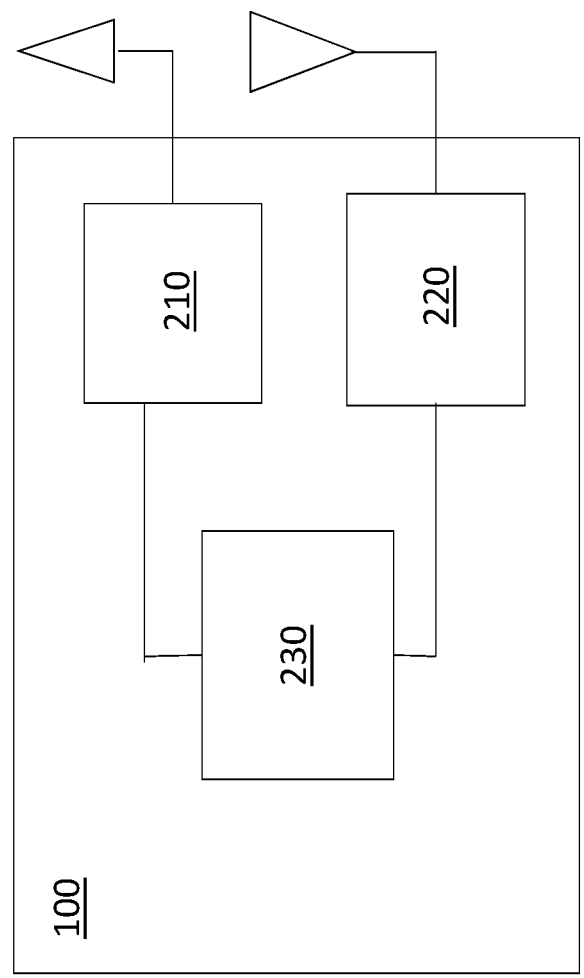
FIG. 2 is a block diagram of the radar system according to one or more embodiments.

FIG. 2 is a block diagram of the radar system 100 according to one or more embodiments. The radar system 100 can be a multi-input multi-output (MIMO) radar with a number of transmit and receive elements that increase the angular resolution. The chirps emitted by each of the transmit elements can be coded to distinguish them. The transmit portion 210 that outputs transmissions 115 and the receive portion 220 that receives reflections resulting from transmissions 115 are coupled to a processor 230 that generates the transmitted signals and processes the received reflections. The antennas of the transmit portion 210 and receive portion 220 may be shared in a transceiver arrangement or separate, as shown.

The processor 230 may include an application specific integrated circuit (ASIC), an electronic circuit, a processor (shared, dedicated, or group) and memory that executes one or more software or firmware programs, a combinational logic circuit, and/or other suitable components that provide the described functionality. The processor 230 can be part of or in communication with one or more known controllers in the platform 105. In the case of the platform 105 being an automobile 110, for example, the known controllers can be involved in the collision avoidance, automatic braking, automatic driving, or other control functions. The processes performed by the processor 230 are further detailed with reference to FIG. 3.

Figure 3:
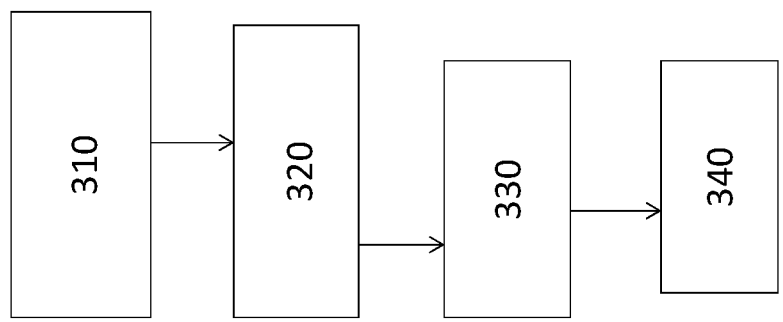
FIG. 3 is a process flow of a method of operating the radar system mounted on a platform according to one or more embodiments.

FIG. 3 is a process flow of a method of operating the radar system 100 of a platform 105 according to one or more embodiments. At block 310, the processes include introducing silent (i.e., receive-only) intervals in the operation of the radar system 100. During the silent intervals, the radar system 100 receives reflections but does not generate any transmissions 115. The silent intervals can be periodic, event-triggered, or both. An increase in the number of moving targets, which implies movement into a traffic-heavy area, exceeding a threshold number can be at trigger, for example. The event may instead be an indication of interference. This indication can be based on reflections that cannot be resolved with respect to the transmissions, for example. Further, the duration of the interval can be fixed or based on the reflections received. The processes are not limited in the timing of operation in the silent interval.

At block 320, the processes include determining the type of each of the radars that are detected during the silent interval. The other radars can include one or more radar systems 100 that also perform the processes shown in FIG. 3. The types of the other radars may be LFM, pulse-Doppler, or fast LFM, for example. Estimating parameters of the other radars, at block 330, includes estimate bandwidth, slope of the frequency modulation, carrier frequency, and coding scheme. This is further detailed with reference to FIG. 4.

Once the other radars in the vicinity that are transmitting and whose resulting reflections are received by the radar system 100 have been identified and the parameters estimated, the information is used for interference mitigation or collaborative operation at block 340. According to one exemplary embodiment, a clean band of frequencies are selected for transmissions 115 to avoid bandwidths that are estimated as being used by the other radars. When the entire bandwidth is in use by other radars, a different slope can be used for frequency modulation according to another embodiment. Knowing the position of other radars and their parameters can also facilitate collaborative operation according to one or more embodiments. For example, the reflections resulting from transmission 115b can be used by the radar system 100a, in addition to the reflections resulting from transmission 115a. The reflections resulting from transmission 115b can provide different information to the radar system 100a than the reflections resulting from transmission 115a and, thus, enhance the operation of the radar system 100a.

Figure 4:
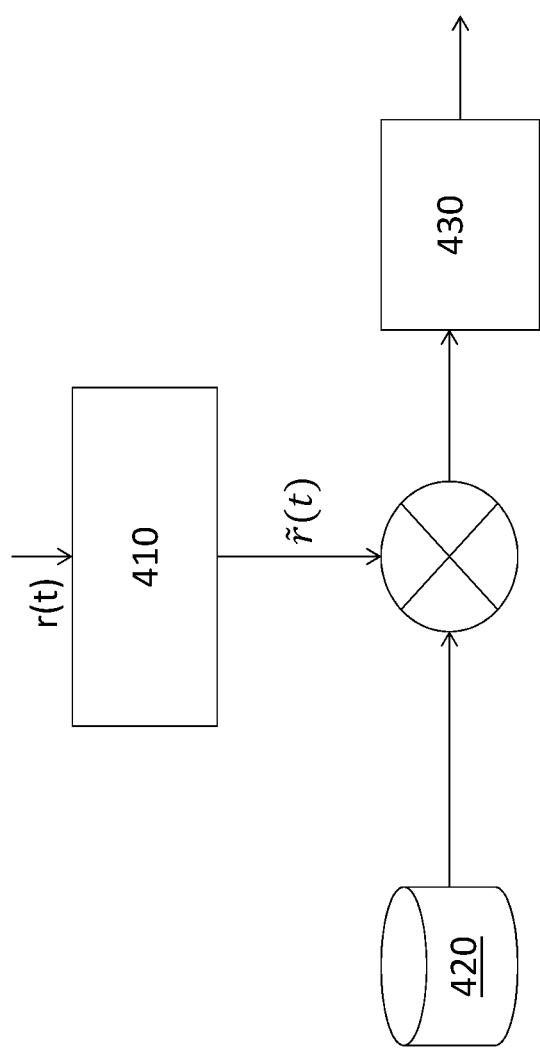
FIG. 4 details processes used to estimate parameters of other radars according to one or more embodiments.

FIG. 4 details processes used to estimate parameters (at block 330) of other radars according to one or more embodiments. These processes can be performed by a combination of the receive portion 220 and processor 230. The processes are based on the fact that a LFM signal (chirp) is characterized by the start of the chirp and the frequency slope. Thus, by determining the time of arrival and bandwidth of a received signal, other useful parameters can be determined. For example, the bandwidth is given by the slope and the duration of the chirp. Thus, the pulse repetition interval (PRI) can be determined from the bandwidth.

At block 410, each received radio frequency signal (r(t)) is down-converted to a baseband signal and processed to estimate all time of arrival and bandwidth pairs that are part of the signal r(t). Each estimated pair ($\tilde{r}(t)$) is correlated with signals from a matched filter bank 420. The correlation output is checked at block 430, and the estimated pair ($\tilde{r}(t)$) that results in the maximum output is estimated as the time of arrival and bandwidth of the received signal.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A radar system mounted on a platform, comprising:
   a transmitter configured to be turned off during a silent interval;
   a receiver configured to receive one or more signals resulting from transmission by one or more other radars that transmit linear frequency modulated signals during the silent interval; and
   a processor configured to estimate parameters of the one or more other radars, wherein the parameters include bandwidth and slope of the respective linear frequency modulated signal and the parameters are used to modify a transmitted signal or the processing by the radar system, and the processor is configured to process subsequent signals resulting from subsequent transmission by the one or more other radars based on the parameters to perform detection.

2. The system according to claim 1, wherein the radar system is mounted on an automobile and the one or more other radars are mounted on other automobiles.

3. The system according to claim 1, wherein the silent interval is periodic.

4. The system according to claim 1, wherein a duration and initiation of the silent interval is triggered by an event.

5. The system according to claim 1, wherein the processor modifies a bandwidth or slope of the transmitted signal to prevent interference with the one or more other radars.

6. A method of operating a radar system mounted on a platform, the method comprising:
   turning off a transmit portion of the radar system during a silent interval;
   receiving one or more signals resulting from transmission by one or more other radars that transmit linear frequency modulated signals during the silent interval;
   estimating parameters of the one or more other radars, wherein the parameters include bandwidth and slope of the respective linear frequency modulated signals; and
   modifying a transmitted signal or the processing by the radar system based on the parameters, wherein the modifying the processing includes receiving subsequent signals from subsequent transmission by the one or more other radars based on the parameters and performing detection.

7. The method according to claim 6, further comprising setting the silent interval to be periodic.

8. The method according to claim 6, further comprising setting a duration and initiation of the silent interval to be triggered by an event.

9. The method according to claim 6, wherein the setting the silent interval to be triggered by an event includes setting the silent interval to be triggered by a location of the platform.

10. The method according to claim 6, wherein the modifying the transmitted signal includes modifying a bandwidth or slope of the transmitted signal to prevent interference with the one or more other radars.

* * * * *